(No Model.) 2 Sheets—Sheet 1.

G. W. MURRAY.
FERTILIZER DISTRIBUTER.

No. 520,889. Patented June 5, 1894.

Witnesses
W. E. Schneider
W. S. Duvall

Inventor
Geo. W. Murray
By his Attorneys,
C. A. Snow & Co.

(No Model.) 2 Sheets—Sheet 2.

G. W. MURRAY.
FERTILIZER DISTRIBUTER.

No. 520,889. Patented June 5, 1894.

Witnesses
W. E. Schneider
W. S. Duvall

Inventor
Geo. W. Murray
By his Attorneys,
C. A. Snow & Co.

THE NATIONAL LITHOGRAPHING COMPANY,
WASHINGTON, D. C.

UNITED STATES PATENT OFFICE.

GEORGE W. MURRAY, OF REMBERT, SOUTH CAROLINA.

FERTILIZER-DISTRIBUTER.

SPECIFICATION forming part of Letters Patent No. 520,889, dated June 5, 1894.

Application filed September 15, 1893. Serial No. 485,611. (No model.)

*To all whom it may concern:*

Be it known that I, GEORGE W. MURRAY, a citizen of the United States, residing at Rembert, in the county of Sumter and State of South Carolina, have invented a new and useful Fertilizer-Distributer, of which the following is a specification.

My invention relates to improvements in fertilizer distributers; the objects in view being to produce a machine of cheap and simple construction, that is strong and durable, and which will drill evenly any fertilizing agent and subsequently cover the drills or furrows.

Various other objects and advantages of the invention will appear in the following description and the novel features thereof will be particularly pointed out in the claims.

Figure 1:
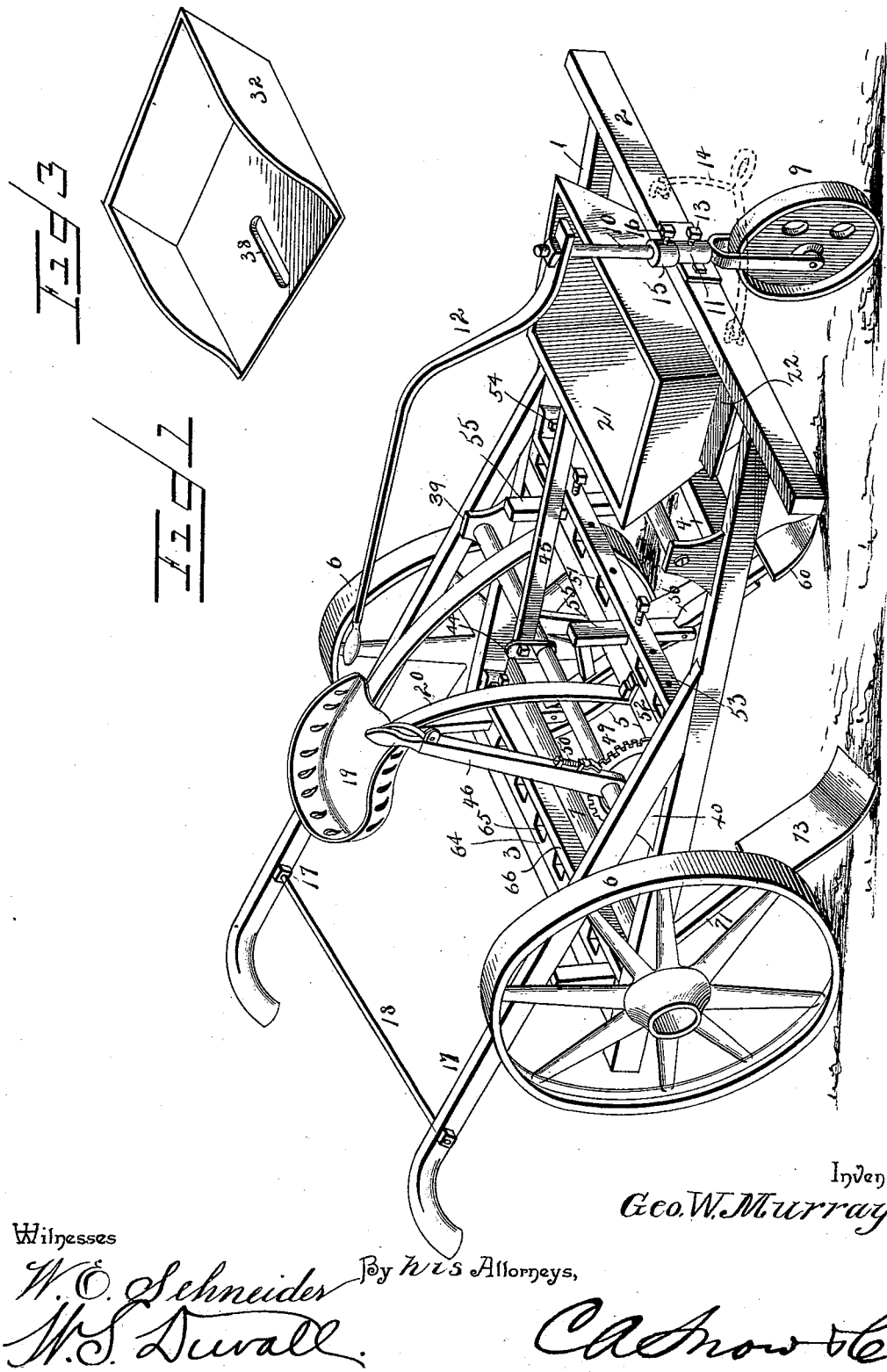
Figure 2:
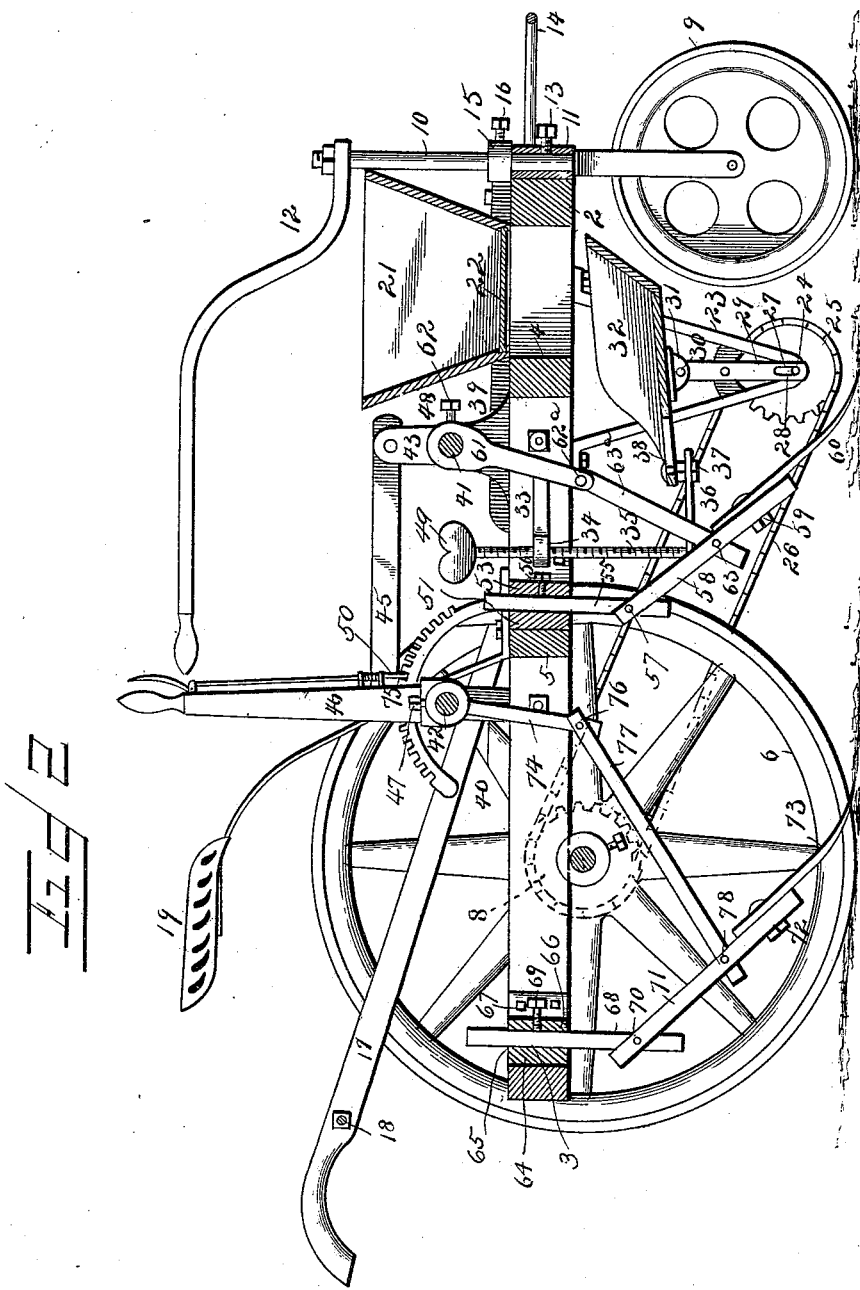

Referring to the drawings:—Figure 1 is a perspective view of a machine embodying my invention. Fig. 2 is a vertical longitudinal sectional view thereof. Fig. 3 is a detail of the vibrating shoe.

Like numerals of reference indicate like parts in all the figures of the drawings.

In the practice of my invention I employ a rectangular framework, comprising opposite longitudinal frame-bars 1, front and rear connecting-bars 2 and 3 respectively, and intermediate connecting-bars 4 and 5. The frame is supported mainly through the medium of ground-wheels 6, that are located fixedly upon a transverse axle 7, with which they revolve, and which is projected beyond one of the ground-wheels and provided with a sprocket-wheel 8. The front end of the frame is supported in the present instance by a caster-wheel 9, whose shank 10, is swiveled in a bearing-eye 11, secured to the front cross-bar 2, and is operated by means of a handle 12. A binding-bolt 13, may be employed for the purpose of binding the swiveled shank within the eye. Any ordinary draft-bail, for instance, as 14, may be located at the front end of the machine, and in fact other means may be provided for securing the swiveled shank 10 in the eye. The shank is further provided with a bearing-collar 15 regulated by a binding-screw 16, the said collar bearing upon the upper end of the eye so that the latter is embraced by the collar and the shoulder of the fork of the shank.

If desired a pair of handles 17 may be bolted to the opposite frame-bars 1, said handles extending in rear of the framework and being connected by a transverse tie-rod 18. I also prefer to employ a seat 19 for the accommodation of the driver, mounting the same upon suitable standards 20 rising from the cross-bar 5.

Between the cross-bars 2 and 4 I support a hopper 21, the same being reduced toward its lower end. This hopper may be provided with any suitable sliding cut-off 22, for the purpose of regulating the discharge of fertilizer. From the opposite frame-bars depend V-shaped hangers 23, in which is journaled a transverse shaft 24, the said shaft projecting beyond one of the hangers and having located thereon a sprocket-wheel 25, which drives the shaft and in turn is driven by a sprocket-chain 26 that passes around said sprocket-wheel 25 and the aforesaid sprocket-wheel 8.

The shaft 24 is cranked, as at 27, between the hangers 23 and the said crank is located in an elongated slot 28 that is formed in a vertical arm or standard 29 pivoted as at 30 at its upper end between the two bearing-ears 31 that are formed upon the lower side of a vibrating distributing shoe 32, the said shoe being located under the discharge end of the hopper.

A bracket-arm 33 extends rearward from the cross-bar 4 and terminates in a threaded eye 34, and adjustably mounted in the same is a screw-threaded adjusting-rod 35, the lower end thereof being secured to a forwardly disposed horizontal plate or bracket-arm 36, at whose front end a vertical headed stud 37 is located. This stud engages a slot 38 formed in the rear discharge-end of the distributing-shoe 32. Thus it will be seen that as the machine moves along motion is transmitted from the axle to the sprocket-wheel 8, through the chain 26 to the sprocket-wheel 25, through the latter sprocket-wheel to the shaft 24 upon which it is mounted, thus operating the crank 27 and vibrating in a horizontal manner the shoe 32. The vibrations of the shoe may be regulated through the medium of an adjusting-rod 35, so that the latter is caused to distribute more or less fertilizer at each vibration. On the other hand, the slide 22 of the hopper may be closed so as to prevent egress of the fertilizing-agent to the shoe.

Transversely opposite bearing-standards 39 and 40, are located respectively upon the frame-bars 1 opposite the transverse frame-bars 4 and 5 or substantially so, and in these bearing-standards 39 and 40 rock-shafts 41 and 42 are journaled. The rock-shafts 41 and 42 are provided at opposite ends with rock-arms 43 and 44 respectively, and these rock-arms 43 and 44 are connected by a longitudinally disposed connecting-bar 45, so that any motion upon the part of one shaft will be communicated to the other. The rear rock-shaft is further provided with an operating-lever 46 that is secured by means of a bolt 47 in position upon the shaft. The rock-arms 43 and 44 are also secured by means of bolts 48 upon their shafts. A toothed segmental locking-standard 49 projects from the cross-bar 5 at the side of the lever 46, and a locking-bolt 50 is arranged upon the lever and designed to engage with the standard.

Located at the front side of the cross-bar 5 is a metal bar 51, having a series of vertical recesses 52, in its front face. A clamping-bar 53, is arranged in front of the bar 51 and has its opposite ends forwardly disposed and bolted as at 54 to the frame-bars 1. A pair of vertical standards 55 are located adjustably in any two of the recesses 52 and are secured in position through the medium of bolts 56 passed through the clamping-bar 53 and impinging upon the standards. These adjustable standards have pivoted at their lower ends as at 57 inclined standards 58 which through the medium of heel-bolts 59 have connected thereto a pair of shovels 60 which take at opposite sides and travel slightly in advance of the vibratory-shoe 32. Adjustable hanger-arms 61 are arranged upon the rock-shaft 41 and secured thereto by means of bolts 62, and pivoted as at 62ª thereto are link-bars 63ª. The lower ends of these link-bars are pivoted as at 63 to intermediate points of the shovel-carrying standards 58.

To the rear cross-bar 3 there is applied a metal bar 64, the same having a series of vertical notches or recesses 65 similar to the bar 51, and arranged in front thereof is a clamping-bar 66 whose ends are forwardly disposed, and by means of bolts 67, connected to the opposite frame-bars 1. A pair of vertical standards 68 are located in any two of the recesses 65, and are secured in position by means of binding-bolts 69 passed through the clamping-bar and impinging upon the vertical standards 68. To the lower ends of these standards 68 are pivoted as at 70 inclined adjustable standards 71, each of which has connected thereto at its lower end by a heel-bolt 72 a shovel 73, the same being of such conformation as to throw the soil inwardly toward the center of the machine. A pair of hangers 74 are loosely mounted upon the shaft 42 and are adjustable by means of bolts 75, and the same have their lower ends pivoted by bolts 76 to the upper ends of link-bars 77 whose lower ends are pivoted as at 78 to intermediate points of the shovel-carrying standards 71.

This completes the construction of the machine, and the operation of the same is as follows:—When traveling to and from the field of operation the hand-lever 46 is swung to the rear, and through the connections described serves to oscillate or rock the rock-shafts 41 and 42, thus causing an elevation of the shovels 60 and 73 from the ground. When it is desired to operate the machine, the hand-lever is swung forward and is locked by means of its adjusting bolt in the segmental standard, and the slide 22 is withdrawn from the hopper so as to permit the fertilizer to fall into the vibrating distributing-shoe, which it will be understood is reciprocated or vibrated in a short jerky manner so as to distribute the fertilizer upon the soil. The shovels 60 previous to such distribution turn the soil over for the fertilizer and being followed by the plows 73 a still greater amount of soil is turned and mixed with the fertilizer, so that as a result a bed containing fertilizer is formed.

From the foregoing description it will be seen that I have provided a machine that may be conveniently and economically operated to evenly distribute fertilizer and form beds for the reception of the plants; that said machine may be readily transported from field to field or from one point to another and may be either operated by the driver riding or by a person following thereafter.

Changes in the form, proportion, and minor details of construction may be resorted to without departing from the principle or sacrificing any of the advantages of this invention.

Certain novel features of construction herein described and illustrated are not herein claimed, but are part of the subject-matter of a companion application pending herewith and bearing Serial No. 480,932.

Having described my invention, what I claim is—

1. In a machine of the class described, the combination with a framework, an axle, and ground-wheels, of a superimposed hopper, opposite bearings arranged therebelow, a crank-shaft located therein, a vibratory-shoe arranged under the hopper, a slotted standard for receiving the crank-shaft and pivoted to the shoe, means for adjusting said shoe, and means for transmitting motion from the axle to the crank-shaft, substantially as specified.

2. In a machine of the class described, the combination with a framework, an axle, and ground-wheels, of a superimposed hopper, opposite bearings below the same, a crank-shaft arranged in the bearings, a vibratory-shoe arranged under the hopper, a slotted standard for receiving the crank-shaft and pivoted to the shoe, means for adjusting said shoe, means for transmitting motion from the axle to the crank-shaft, and shovels arranged at opposite sides of the shoe, substantially as specified.

3. In a machine of the class described, the combination with the framework, the axle having the sprocket-wheel, and the ground-wheels, of the superimposed hopper arranged at the front end of the machine, depending hangers, the vibratory shoe arranged under the hopper, the slotted standard pivoted to the shoe, the transverse cranked shaft engaging the slot of the standard and journaled in the hangers, a sprocket-wheel at the outer end of the crank-shaft, the sprocket-chain connecting the same with the sprocket-wheel of the axle, the bearing-arm extending from the framework and having a threaded eye, an adjusting rod threaded in the bearing-bracket, a forwardly extending arm at the lower end of the rod, and a loose connection between said arm and vibratory shoe, substantially as specified.

4. In a machine of the class described, the combination with the framework, the axle having the sprocket-wheel, and the ground-wheels, of the superimposed hopper arranged at the front end of the machine, depending hangers the vibratory-shoe arranged under the hopper, the slotted standard pivoted to the shoe, the transverse cranked shaft engaging the slot of the standard and journaled in the hangers, the sprocket-wheel at the outer end of the cranked-shaft, the sprocket-chain connecting the same with the sprocket-wheel of the axle, a bearing-arm extending from the framework and having a threaded eye, an adjusting-rod threaded in the bearing bracket, a forwardly extending arm at the lower end of the rod, a stud rising from the arm and loosely engaging a slot in the front end of the shoe, substantially as specified.

In testimony that I claim the foregoing as my own I have hereto affixed my signature in the presence of two witnesses.

GEORGE W. MURRAY.

Witnesses:
E. G. SIGGERS,
W. S. DUVALL.